(12) United States Patent
Bansod et al.

(10) Patent No.: US 8,065,421 B2
(45) Date of Patent: *Nov. 22, 2011

(54) RECIPROCAL PUBLIC TRUST RELATIONSHIP

(75) Inventors: Aditya Bansod, San Francisco, CA (US); Charles Reeves Little, San Jose, CA (US); Jason D. Walter, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/027,701

(22) Filed: Feb. 15, 2011

(65) Prior Publication Data

US 2011/0138062 A1 Jun. 9, 2011

Related U.S. Application Data

(63) Continuation of application No. 11/158,275, filed on Jun. 20, 2005, now Pat. No. 7,912,960.

(51) Int. Cl.
*G06F 15/16* (2006.01)

(52) U.S. Cl. ........ 709/227; 709/228; 709/249; 370/232; 370/259; 713/193

(58) Field of Classification Search .................. 709/227, 709/249; 713/193; 370/232, 259
See application file for complete search history.

(56) References Cited

U.S. PATENT DOCUMENTS

| | | | |
|---|---|---|---|
| 5,995,099 A | 11/1999 | Horstmann | |
| 6,285,999 B1 | 9/2001 | Page | |
| 7,383,230 B2 * | 6/2008 | Wolff | 705/53 |
| 2003/0028585 A1 | 2/2003 | Yeager et al. | |
| 2003/0046097 A1 | 3/2003 | LaSalle et al. | |
| 2004/0015588 A1 | 1/2004 | Cotte | |
| 2004/0128544 A1 | 7/2004 | Hondo et al. | |
| 2004/0260701 A1 | 12/2004 | Lehikoinen et al. | |
| 2005/0033974 A1* | 2/2005 | Ansell et al. | 713/193 |
| 2005/0209999 A1 | 9/2005 | Jou | |
| 2006/0288073 A1 | 12/2006 | Bansod et al. | |
| 2008/0316925 A1* | 12/2008 | Dolin et al. | 370/232 |
| 2009/0013375 A1* | 1/2009 | MacIntosh et al. | 726/1 |
| 2009/0109877 A1* | 4/2009 | Murray et al. | 370/259 |
| 2010/0161382 A1* | 6/2010 | Cole | 705/10 |

OTHER PUBLICATIONS

U.S. Appl. No. 11/158,275, filed Jun. 20, 2005.
Van House, Nancy, "Weblogs: Credibility and Collaboration in an Online World", CSCW Workshop on Trust, Oct. 2004, 7 pages, School of Information Management and Systems, University of California, Berkeley, California.
Massa, Paolo, "Trust-aware Decentralized Recommender Systems: PhD Research Proposal", May 29, 2003, 20 pages, Department of Information and Communication Technology-University of Trento, Povo, Italy.

(Continued)

*Primary Examiner* — Thu Ha Nguyen
(74) *Attorney, Agent, or Firm* — Vierra Magen Marcus & DeNiro LLP

(57) ABSTRACT

Publicly accessible linking information is to establish a trusted relationship between reciprocally linked entities controlling web resources, such as websites or web logs. A method of establishing a trust relationship between two entities identifying a user-installed link to a second web resource in a first web resource. Next, the method determines when a reciprocal link is made in the second web resource directed to the first web resource and creates a trust relationship between the entities based on the reciprocal link.

20 Claims, 6 Drawing Sheets

OTHER PUBLICATIONS

Inernational Business Machines (IBM) Corporation, Microsoft Coproation, RSA Security Inc., and Verisign Inc., "Web Services Trust Language (WS-Trust)" [online], Dec. 18, 2002 [retrieved on May 3, 2005], 22 pages, Retrieved from the Internet: <URL:http://msdn.microsoft.com/webservices/default.aspx?pull=/library/en-us/dnglobspec/html/ws-trust1202.asp>.

Terpstra, John H., Rafal Szczesniak, Jelmer R. Vernooij, Stephen Langasek, "Interdomain Trust Relationships", Chapter 16, Part III, Advanced Configuration, The Official Samba-3 HOWTO and Reference Guide, Apr. 3, 2003 [retrieved on May 3, 2005], 7 pages, Retrieved from the Internet: <URL:http://info.ccone.at/INFO/Samba/InterdomainTrusts.html>.

Microsoft Corporation, "How Trust Relationships Work", Windows 2000 Resource Kits, Establishing Trust Relationships, May 19, 2003 [retrieved on Sep. 19, 2005], 2 pages, Retrieved from the Internet: <URL:http://www.microsoft.com/resources/documentation/Windows/2000/server/reskit/en-us/Default.asp?url=/resources/documentation/windows/2000/server/reskit/en-us/deploy/dgbe_sec_BKHY.asp>.

Ivens, Kathy, "Troubleshooting Domains", Windows NT Troubleshooting, Feb. 1998 [retrieved on Sep. 19, 2005], 9 pages, Retrieved from the Internet: <URL:http://www.windowsitlibrary.com/Content/638/03/2.html...>.

Office Action dated Jan. 21, 2009, U.S. Appl. No. 11/158,275, filed Jun. 20, 2005.

Examiner Interview Summary dated Apr. 7, 2009, U.S. Appl. No. 11/158,275, filed Jun. 20, 2005.

Response A to Office Action dated Apr. 21, 2009, U.S. Appl. No. 11/158,275, filed Jun. 20, 2005.

Final Office Action dated Aug. 4, 2009, U.S. Appl. No. 11/158,275, filed Jun. 20, 2005.

Response B to Final Office Action filed with RCE dated Nov. 3, 2009, U.S. Appl. No. 11/158,275, filed Jun. 20, 2005.

Office Action dated Nov. 16, 2009, U.S. Appl. No. 11/158,275, filed Jun. 20, 2005.

Response C to Office Action dated Feb. 16, 2010, U.S. Appl. No. 11/158,275, filed Jun. 20, 2005.

Final Office Action dated May 25, 2010, U.S. Appl. No. 11/158,275, filed Jun. 20, 2005.

Response D to Final Office Action filed with RCE dated Aug. 25, 2010, U.S. Appl. No. 11/158,275, filed Jun. 20, 2005.

Notice of Allowance and Fee(s) Due dated Dec. 10, 2010, U.S. Appl. No. 11/158,275, filed Jun. 20, 2005.

Issue Fee Payment dated Feb. 10, 2011, U.S. Appl. No. 11/158,275, filed Jun. 20, 2005.

* cited by examiner

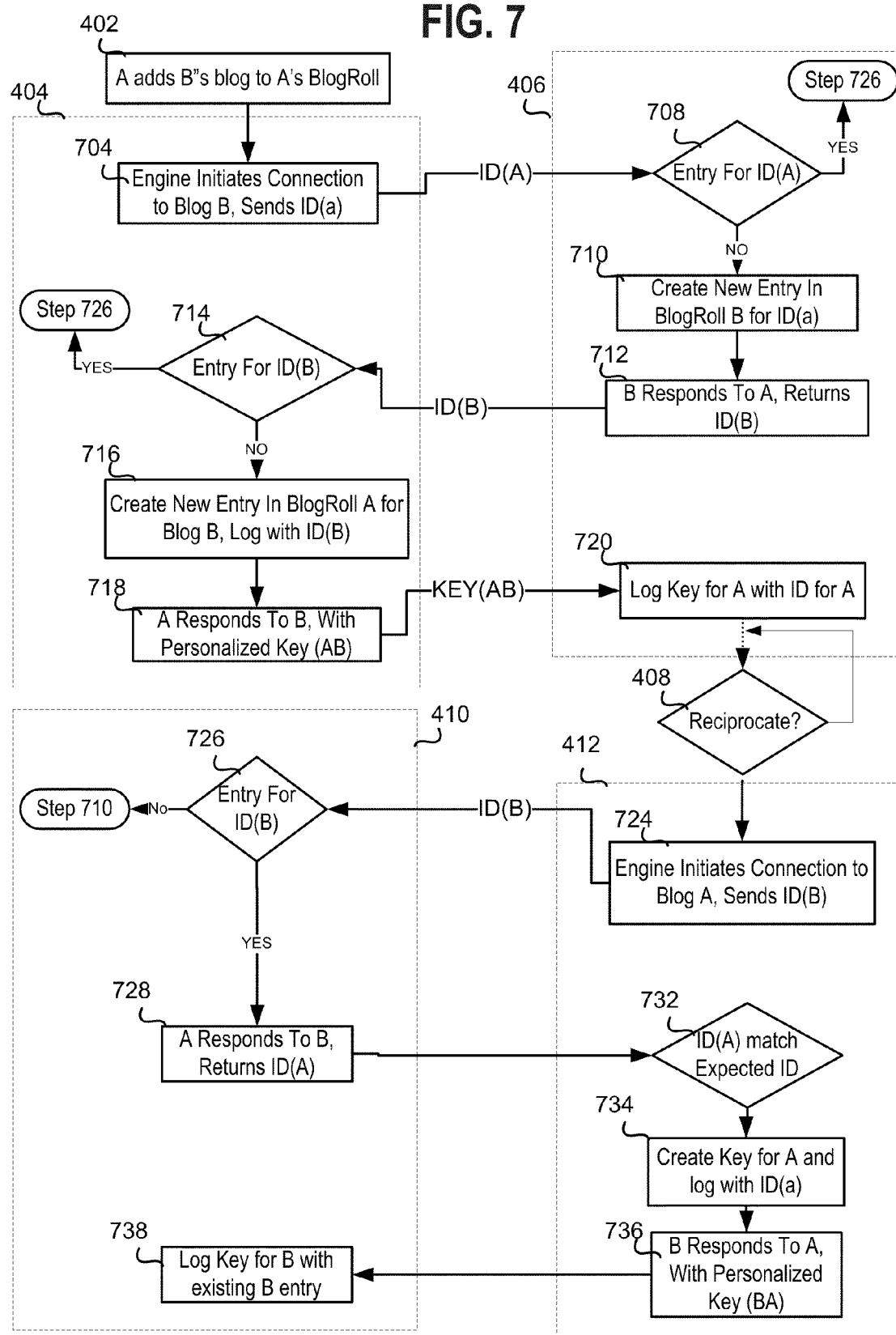

RECIPROCAL PUBLIC TRUST RELATIONSHIP

CLAIM OF PRIORITY

This application is a continuation of U.S. patent application Ser. No. 11/158,275, entitled "RECIPROCAL PUBLIC TRUST RELATIONSHIP," now U.S. Pat. No. 7,912,960, filed Jun. 20, 2005, which is incorporated herein by reference in its entirety.

BACKGROUND

One aspect of the Internet communication which has grown significantly of late is web-logs (commonly referred to as "blogs"). Generally, blogs are personal Web sites that contain dated entries in reverse chronological order (most recent first) about a particular topic. Blogs generally function as a journal for one person or a group of contributors. Entries contain the dated entries of the owner or owning entity, commentary by a group, or the public in general, as well as multimedia content and links to other Web sites.

Many blog sites offer an RSS or ATOM syndication feed that provides headlines of their latest entries along with URLs to the content. Hence, blogs can be read in a simple Web-browsing application, or via a feed-reader application.

Many blog applications publish what is known as a "blogroll" on the front page of a blog. A blog roll is literally a list of the blogs that the blog owner reads. For example, on a personal blog, one blogger may have on his blogroll the list of his friend's blog. The blogroll is generally stored in a set of code which can be accessed programmatically, but may be stored in any format.

While some blogs invite feedback and comments from visitors, others are maintained by the discretion of the controlling entity, and can only be read by "authorized parties". An authorization process is used by the controlling entity to establish a trust relationship to allow other entities access to the private portions of the blog.

SUMMARY

The present invention, roughly described, pertains to the use of publicly accessible linking information to establish a trusted relationship between entities controlling reciprocally linked web resources, such as websites or web logs.

In one embodiment, a method of establishing a trust relationship between two entities is provided. The method includes identifying a user-installed link to a second web resource in a first web resource. Next, the method determines when a reciprocal link is made in the second web resource directed to the first web resource and creates a trust relationship between entities based on the reciprocal link.

In a further embodiment, a method of establishing a trust relationship between two entities is provided. The method includes identifying a publication of a first user's blog in a second user's blogroll; receiving a notification of a publication of a second user's blog in the first user's blogroll; and establishing a trust relationship responsive to said step of receiving.

In another embodiment, a reciprocal trust engine for a Web resource is provided. The engine includes a data store scanner analyzing a data store of publicly accessible links to network accessible sites associated with the Web resource. Also included is a site identifier process outputting a resource identifier to a linked site associated with a new link in the data store. The engine further includes a key roll engine storing a unique identifier from the linked site indicative of the linked site having added a link to the Web resource in a reciprocal data store on the linked site.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 7 is a flow chart illustrating a reciprocal trust relation process.

DETAILED DESCRIPTION

Trust relationships are created between entities (or users) controlling web resources (such as websites or blogs) by utilizing reciprocating relationships between the web resources. In one embodiment, the reciprocating relationship is a public function both entities identifying each other's website or blog in metadata on one's own website or blog. An automated process tracks when a user identifies another website or blog that the user is reading, and later when the identified website reciprocates this identification. This reciprocal publishing of who a website or blog's owner reads leads to a reciprocal trust relationship. Once the two parties have published their data in the open, they can communicate secret keys with each other, store the key of their exchanging party, and use both keys on subsequent communication requests to validate the authenticity of the partner, or provide encrypted communications.

Suppose, for example, two friends, User A and User B, each have a blog, and that each blog has public and private portions. The private portions are only viewable by those with whom which the blogger has created a trust relationship. User A's blogroll lists that she reads User B's blog. On User B's blog lists that she reads User A's blog. The method described herein creates an implicit relationship based on the fact that the entities have reciprocally listed each on their respective blogrolls and this inherent trust may be used as a trust mechanism to, for example, allow User A to read permission content on User B's blog and vice-versa.

In one embodiment, two entities are hosted on the same server or by the same enterprise service provider (ESP), and monitor all users hosting sites or blogs within the ESP for reciprocal postings. In another embodiment, where sites or blogs are hosted on different servers, a SOAP protocol is used to transmit a message between respective blog servers, carrying the identification of the identifying entity. If the other entity decides to add the original entity, the entity ID is sent to the original server using the SOAP protocol.

In another embodiment, this exchange is automated, and does not require user intervention, presuming that the act of adding read sites or blogs to a website or blogroll implies that the two bloggers have a trust relationship.

Establishing trust relationships will be discussed in accordance with an implementation in a weblog. However, it will be understood that the scope of the relationships need not be limited to web logs, but may include any website or online resource. Indeed, a web log is essentially one form of a website.

Figure 1:
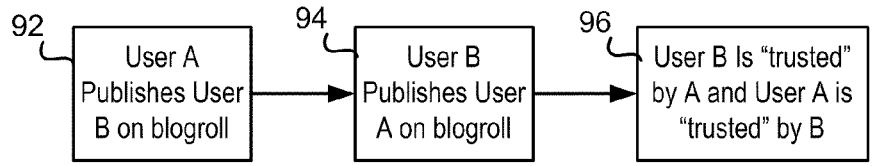
FIG. 1 is a flow chart illustrating a first method discussed in specification.

A general method for establishing a trust relationship is shown in FIG. 1. At step 92, when a first user, user A, publishes another user, user B, on user A's blogroll, as discussed below, data will be added to user A. Next, when user B at step 94 publishes user A on user B's blogroll, at step 96, a trust relationship exists between user A and user B such that user B is trusted by A and user A is trusted by B.

Figure 2:
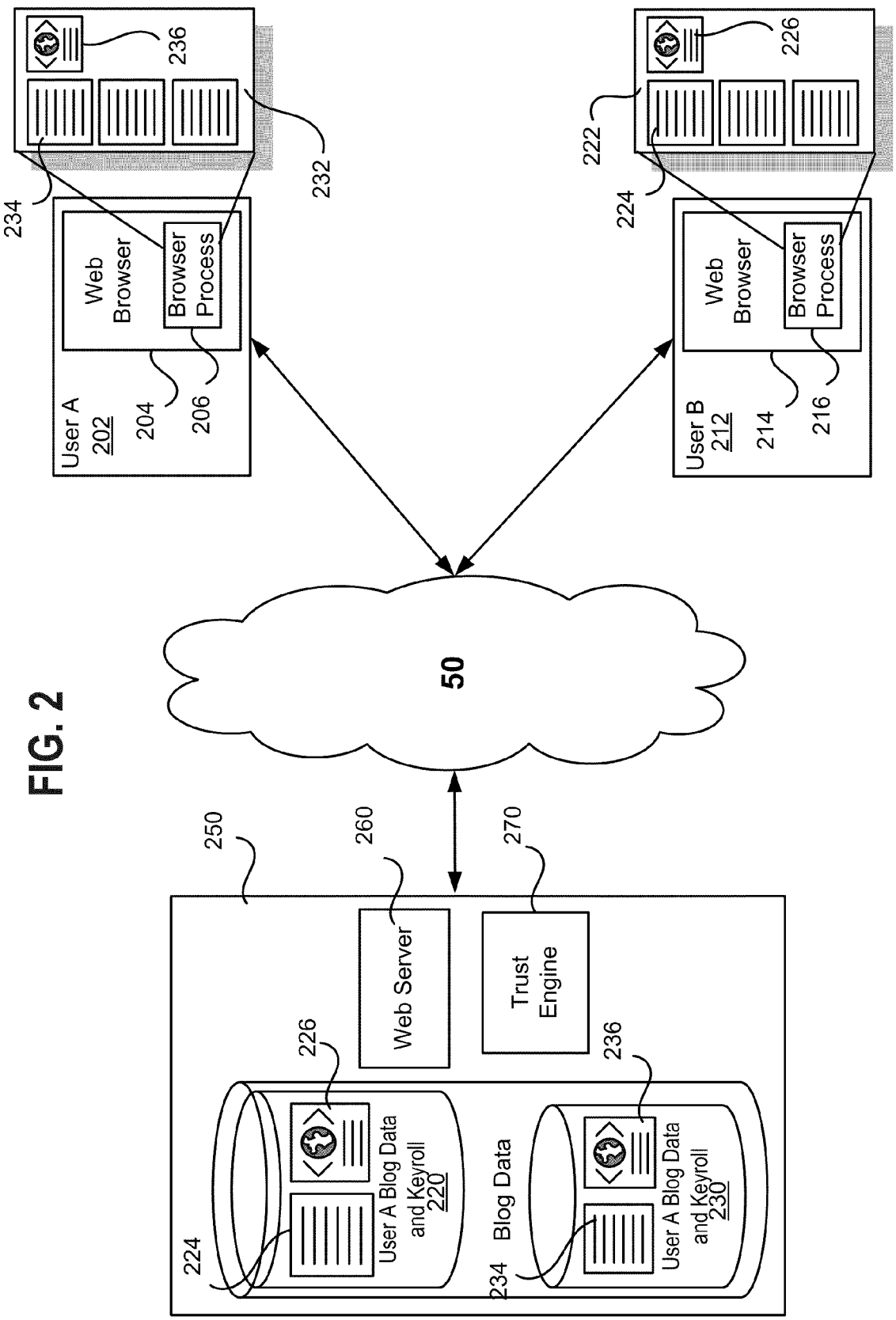
FIG. 2 is a block diagram illustrating a first system suitable for implementing any of the method discussed herein.
Figure 3:
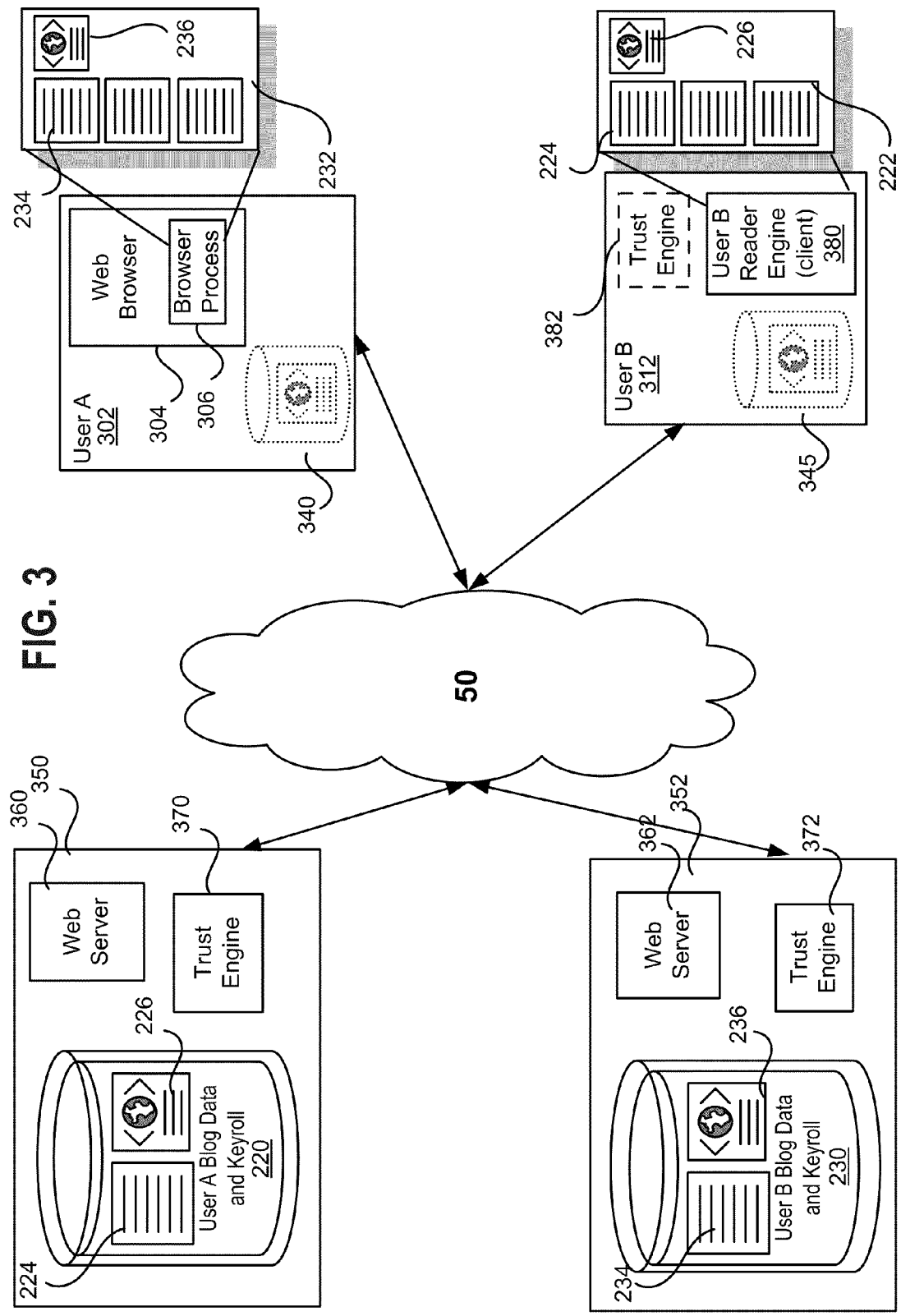
FIG. 3 is a block diagram illustrating a second system suitable for implementing any of the method discussed herein.

FIGS. 2 and 3 illustrate two different types of environments in which the methods discussed herein will be useful. In FIG. 2, a processing device 250 may be provided by an ESP such as, for example, MSN®. The processing environment 250 may include a web server 260, a trust engine 270 and a data store 220. Data store 220 includes online resources such as blogs or websites organized on a per entity (or per user) basis. The web server 260 functions in accordance with well-known techniques to deliver web pages and other files to applications such as Web browsers via the HTTP protocol. Environment 250 may be a single physical server comprising a processing device such as that shown in FIG. 10 (with web server 260 and engine 270 running as processes on a processing device 250), or may be a plurality of processing devices, with individual servers dedicated to providing the web server, trust engine and data storage functions.

Data store 220 may include individual user data 220, 230, including blog data 224, 234 and blogroll data 226, 236 for one or more users. As illustrated in FIG. 2, blog data and keyroll data for user A is stored in a first user data structure 220. User A's blog data 224 may include a list of entries and comments provided by user A and those authorized by user A to enter comments. A blog roll 226 is also included in user A's blog data. A blog roll is a collection of links to other web logs. Various web log authors have different criteria for including other web logs on their blogrolls. This may include common interests to frequency of updates and posts to simple link exchange information. Likewise, a user data store 230 holds blog data 234 and a blogroll 236 for user B.

In general, blogrolls are provided in an XML based format which allows the definition of the entries as metadata in the blogroll 226, 236. One format for storing blogroll data is outline processor markup language (OPML). The OPML specification defines an outline as an hierarchical ordered list of arbitrary elements. Because the specification is fairly open, it is suitable for many types of list data. One example of an OPML structure which defines a blogroll is shown as follows:

```
<?xml version="1.0" encoding="UTF-8"?>
<opml version="1.0">
    <head>
        <title>ourFavoriteFeedsData.top100</title>
        <dateCreated>Fri, 02 Jan 2004 12:59:58 GMT</dateCreated>
        <dateModified>Fri, 23 Jul 2004 23:41:32 GMT</dateModified>
        <ownerName>John Doe</ownerName>
        <ownerEmail>John@example.domain</ownerEmail>
        <title>John's blogroll</title>
    </head>
    <body>
        <outline text="Techblog" count="347" xmlUrl="http://Techblog.domain/techblog.rss" />
        <outline type="rss" text="Newspaper: Top News Stories" title="Newspaper: Top News Stories" xmlUrl="http://www.newspaper.domain/rss/feeds/news.xml"/>
        </outline>
    </body>
</opml>
```

Environment 250 communicates via network 50 such as the internet, with user processing devices, such as devices 202 and 212. Devices 202 and 212 may in one embodiment comprise processing devices such as those described below with respect to FIG. 10. Each processing device is suitable for implementing a web browser application 202 which instantiates a browser process 206. The browser process 206 will render a user display of a web log 232 using well-known techniques. In the example shown in FIG. 2, user A operating processing device 202 includes a browser process 206 which displays a web page 232 of the data in user B's web log including user B's entries 234 and blogroll 236. Likewise, user B operating processing device 212 having a web browser 214 and browser process 216 which displays a web page 226 of user A's web log entries 234 and blogroll 226. It should be well understood that the processing devices 202 and 212 can be utilized to update each user's own individual own web log entries and display those entries in the browser processes.

In the embodiment shown in FIG. 2, the blogrolls 226 and 236 are stored on the computing environment 250. As will be discussed below, the blogrolls may optionally be stored on user devices.

FIG. 3 illustrates several alternatives to the environment shown in FIG. 2; elements having the same reference numbers indicated in FIG. 2 represent the elements shown in FIG. 2. For example, in FIG. 2 a single computing environment 250 included data for both web logs of user A and user B; in FIG. 3, two different processing environments 350 and 352 may separately provide the respective web log data 220 and 230 for users A and B. In the example shown in FIG. 3, each computing environment 350, 352 includes its own web server 360, 362 and trust engine 370, 372. Any number of computing environments 350, 352, web servers 360, 362, and trust engines 370, 372, can be provided for the blog or web page information 220, 230. Also shown as a processing device 302, which, in this example, is utilized by user A to display user B's blog information 232. Many types of web browsers include plug-ins which allows the web browser to incorporate OPML feedlists, including blogrolls. As such, web browser 304 may incorporate and store an individual user's blogroll, in this case user A's blogroll 340, locally on the processing device 302. Likewise, processing device 312 may store user B's blogroll 345. In the example shown in FIG. 3, user B utilizes a client based feed reader application 380 and optionally, a local trust engine 382. The reader application 380 can render the blog 222 of user A in a manner similar to a web browser, or using its own stylized application format, such as a cascading style sheet. Alternatively, the client application 380 can render a really simple syndication (RSS) format or an RSS feed of the blog entries, if the web server providing the blog entries supports the RSS format. An RSS feed is a summary of a web site content that is published in the RSS format for download. Numerous variations on the aforementioned systems shown in FIGS. 2 and 3 may be utilized in accordance with the methods discussed herein. It will be recognized that while the present application is discussed with respect to blogrolls and RSS feeds, the application is not limited to merely blogs and RSS feeds. The application can be utilized with any web based format to provide information and establishment of a publicly reciprocal trust relationship. For example, any web page having end points as discussed herein can be utilized.

Figure 4:
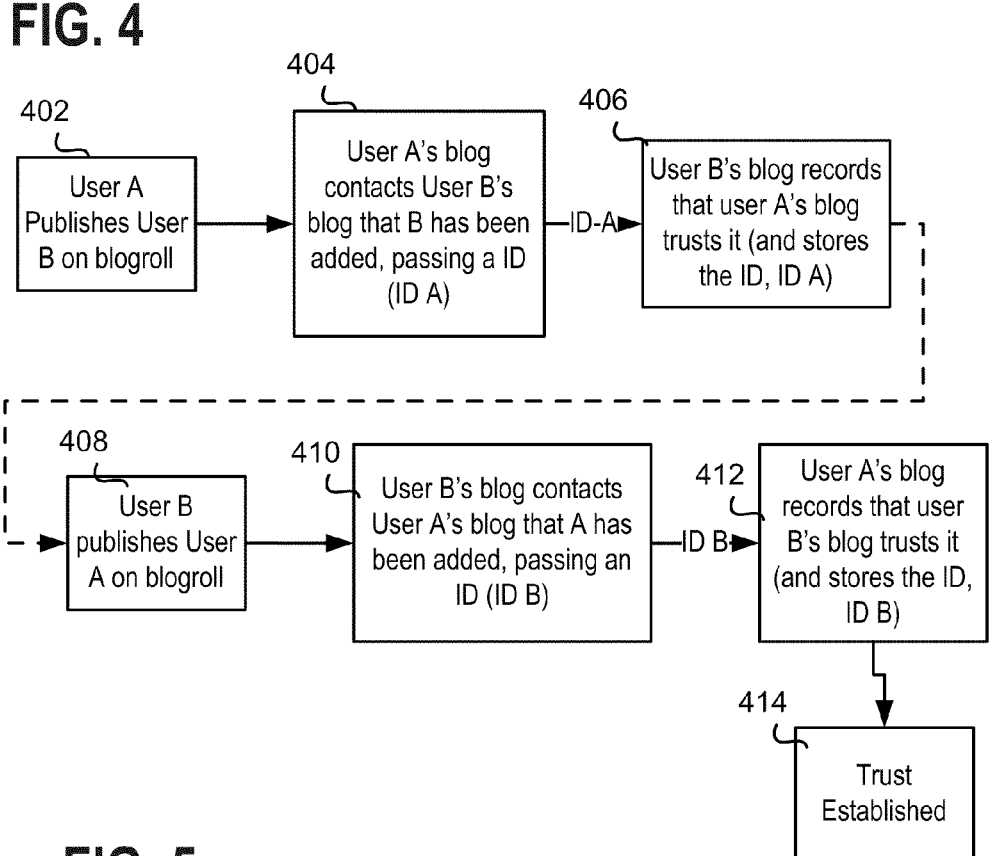
FIG. 4 is a flow chart illustrating a trust relationship method in accordance with the present invention.

FIG. 4 is a flow chart illustrating a first method for establishing a publicly reciprocal trust relationship using exchanged identifiers for the online resources. In FIG. 4, the method begins at step 402 when user A publishes user B on user A's blogroll (or otherwise establishes a link to User B's site on User A's site). This action at step 402 establishes that user A has some relationship with user B as discussed above. At step 404, once the user's been added at step 402, user A's blog will contact user B's blog to indicate the user B has been added and pass an ID (ID(A)) to user B's blog. At step 406, user B's blog will record that user A's blog trusts it and store the ID passed by user A's blog (ID(A)).

At a temporarily separate point in time as indicated by the dashed line between steps 406 and 408, user B may decide to publish user A's blog on user B's own blogroll at step 408. When this occurs, user B's blog contacts user A's blog and indicates that user A has been added, passing an ID (ID(B)) to user A's blog at step 410. At step 412, user A's blog records that user B's blog trusts it and stores the ID (ID(B)) in a manner which associates it with user B's blog. At step 414, the trust has been established between the two blogs.

Steps 404, 406, 410, and 412 may be performed optionally by the trust engines discussed above. Each trust engine may be implemented by code operated by the processing device to establish a process which runs in the background and scans the user's blogroll for changes. Once an addition or deletion has occurred, the process described in FIGS. 4, 5, 6, 7, and 8 can then occur in the background, or at the instantiation of the user via a specific trust establishment request.

In the method of FIG. 4, it will be understood that the name by which User A identifies User B's blog (and vice versa) may not be consistent. Example, User A's blog may be titled "A's Blog", while User B may refer to User A's blog as "The Blog of A". The ID is a mechanism used to store a reference to the correct resource no matter what the name is, allowing the user to support name changes in User A's blog. The mechanism could be any number of things—unique keys, a URL, a string of both blog names, etc. In one embodiment, the ID is the actual URL, since a blog name is more likely to change. As noted above, a blogroll in OPML format includes a "NAME", and URL, allowing the URL, for example, to be the identifying characteristic. IDs are unique to the publisher of a blog and may include a secret key that is stored locally with the blog and passed long to any partner. The metadata in a blog points to any endpoints of a blog where data can be sent and queried programmatically. The endpoint, for example a URL, (typically) allows the trust engine to communicate with a blog.

In a further embodiment, entities can communicate using a SOAP protocol is used to transmit a message between respective blog server carrying the identification of the identifying entity. If the other entity decides to add the original entity, the entity ID is sent to the original server using the SOAP protocol.

An exemplary SOAP protocol message is as follows:

```
<env:Envelope xmlns:env="http://www.w3.org/2003/05/soap-envelope">
    <env:Header>
        <n:ReciprocalID xmlns:n="http://foo.com/ID">
        </n:ReciprocalID>
    </env:Header>
    <env:Body>
        <m:ID>
            <m:ID Value http://blogplace/UserA</m:ID Value>
        </m:ID>
        <m:KEY>
            <m:KEY Value>09a8f</m:KEY Value>
        </m:ID>
    </env:Body>
</env:Envelope>
```

Figure 5:
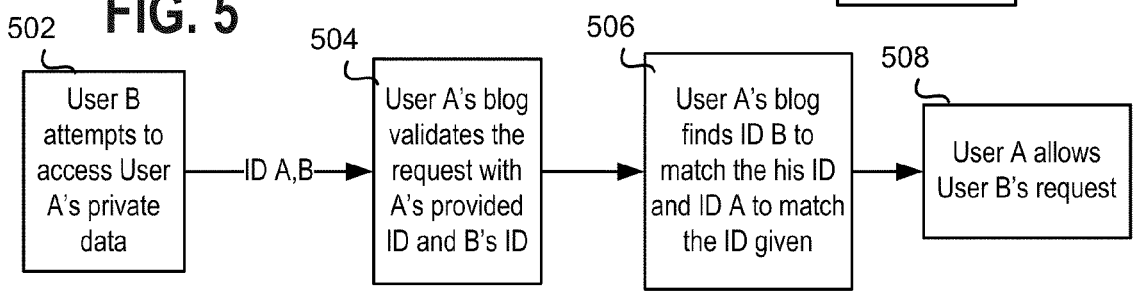
FIG. 5 is a flow chart illustrating a first verification process.
Figure 6:
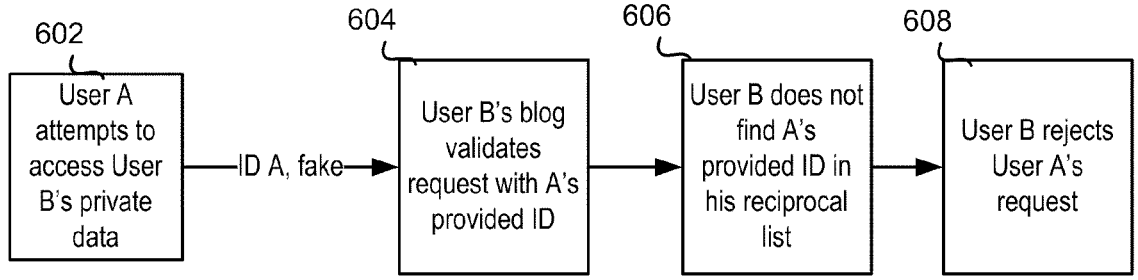
FIG. 6 is a flow chart illustrating a failed verification process.

In the foregoing example, the Reciprocal ID message contains an ID URL of User A's blog and a shared key value Once the trust relationship is established, the trust relationship can be used to allow or deny access to secure or private areas of a site. FIG. 5 shows a flow chart illustrating the events which occur when User B attempts to access a private area of User A. At step 502, User B attempts to access User A's private data. In doing so, User B will pass User A's ID back to User A along with B's own identification information. At step 504, User A's trust engine will validate the request with A's provided ID and B's ID. At step 506, User A's blog find ID(B) to match the ID provided by B and ID(A) to match the ID given. At step 508, the request will be allowed. FIG. 6 illustrates the process which occurs when a fake ID is provided. If User A attempts to access User B's private data at 602, and provides a fake ID, at step 604 User B's blog will attempt to validate the request with A's provided ID. At step 606, User B's blog will not find A's provided ID in the reciprocal list and User B will reject User A's request at step 608.

FIG. 7 illustrates the process of exchanging keys to create the publicly reciprocal trust relationship in a more detailed fashion. In a process by which the blogs introduce themselves, the two blogs need to establish two key items: a common understanding of who they are, and an exchange of keys. As noted above, user A may define user B's blog as "B's blog" while user B may have their blog defined as a "blog by B." Given this discrepancy, the blogs need to agree upon a common point of reference for naming.

The method shown in FIG. 7 begins at step 402 where, as in FIG. 4, user A adds user B's blog to A's blogroll. At step 704, the trust engine operating on behalf of user A initiates a connection to blog B and sends an ID (ID(A)). At step 706, user B's trust engine will receive the ID and determine at step 708 whether or not an entry for ID(A) exists. If no entry for ID(A) exists, at step 710, a new entry in blogroll B for ID(A) is created. At step 712, user B responds to user A and returns their own identifier (ID(B)) at step 712. At step 714, blog trust engine for user A determines whether an entry for ID(B) exists. If not, it creates a new entry in blogroll A for blog B and logs it with ID(B). Blog A then responds to blog B at step 718 with a personalized key (Key(AB)). When received by blog B at step 720, blog B logs the key for A with the ID entry (ID(A)) for A.

At what is likely to be a temporarily distinct point in time as indicated by the dashed line between 720 and step 408, User B may decide to reciprocate at step 408. Until the user B decides to reciprocate, the actions below step 408 do not occur. It will be recognized that step 408 may be automated. If user B reciprocates at step 408, then the transaction engine acting on behalf on blog B initiates connection to blog A and sends its own ID (ID(B)) at step 724. When this is received at step 726, blog A determines whether an entry for ID(B) exists. If an entry does exist, no new entry is created at step 728, blog A responds to B and returns its own ID (ID(A)) which indicates to blog B that it supports the trust identification function. When blog B receives ID(A) at step 732, it compares the received ID(A) to the expected ID for a blog associated with user A. If there is a match at step 732, then at step 734 it creates a key for A and logs it with ID(A) at step 734. At step 736, B responds to A with a new personalized key for B (key(BA)) and returns the key to log A for entry at step 738. Log A logs the key for B in the existing B entry in the blogroll. Future requests for private area can utilize the associated IDs (ID(A), ID(B)) and keys (Key(AB) and Key(BA)) to identify trusted relationships.

In order to maintain security between blogs and passed keys, a keyroll may be utilized. A keyroll may comprise a data file similar in concept to the blogroll. The keyroll can comprise a part of the blogroll by adding additional fields to the XML data, or could be a completely separate file to give an added level of security to the key data. The keyroll could be stored in an XML structure similar to the OPML format used for blogroll data. The keyroll may contain identifying data for trusted sites entered in the user's blogroll file along with specific security data for the individual sites. This security data could be in the form of an encrypted key-pair or other authentication mechanism.

Figure 8:
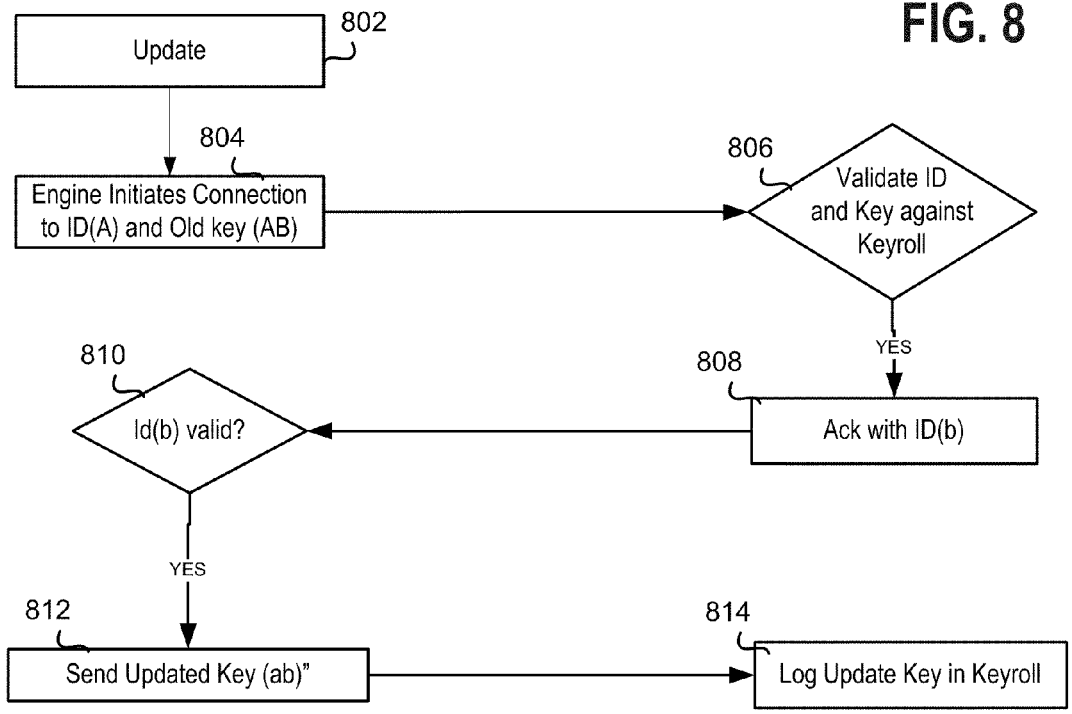
FIG. 8 is a flow chart illustrating a key update process.

In order to further maintain security, keys can be periodically updated using an update process illustrated in FIG. 8 is provided. The update can be manual or automatic, depending on the implementation and user preference. At step 802, an update of the blogroll occurs. As noted above, this can be manual or automatic. At step 804, the trust engine acting on behalf of user A sends ID(A) in the old key (keyAB) to the engine for blog B. At step 806, blog B attempts to validate keyAB and ID(A) against the known entries in the keyroll of blog B. If the key is validated at step 806, then at step 808, blog B sends an acknowledgement with its ID (ID(B)). Blog A then compares ID(B) to the entry in its keyroll at step 810, and if ID(B) is valid, blog A sends an updated key at step 812. The updated key, KeyAB', is then forwarded to the transaction engine for blog B and the keyroll for blog B is updated at step 814.

Figure 9:
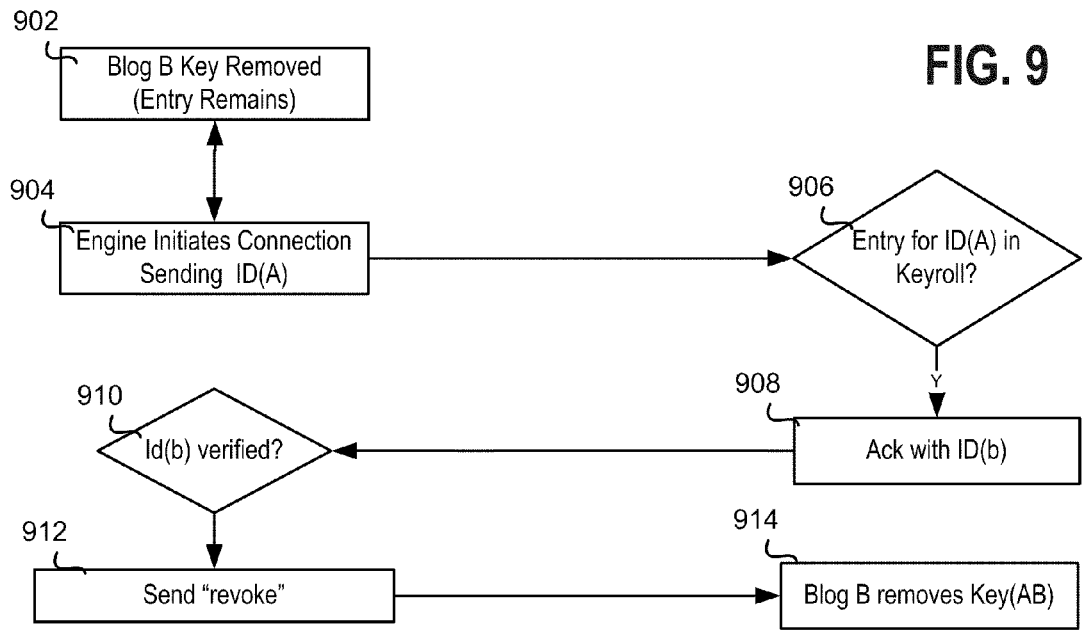
FIG. 9 is a flow chart illustrating a key removal process.

FIG. 9 illustrates a situation where blog owner decides they are no longer interested in sharing a relationship with the other blog. In this case, the blog revoking trust will remove a keyroll entry for the other blog and notify the other blog of a change. Confirmation is not required since no permission is needed to downgrade a trust relationship. As shown in FIG. 9, at step 902, the blog B key is removed from the keyroll at blog A. At step 904, blog A initiates a transaction to blog B passing its ID (ID(A)). At step 906, blog B finds the entry for ID(A) in its own keyroll and acknowledges the entry with its own ID at step 908. At step 910, blog A verifies the entry for ID(B) and at step 912, sends an invalidated key, or "revoke" command. Blog B removes the key from its own keyroll. Optionally, the entries for the blogs can likewise be removed.

Keys may also be used for access control—key pairs shared by two blogs can also be used for encryption. Since both blogs share a unique pair of keys, encryption can be secure, dependent on the complexity of the keys. When used for encryption, user A will sign into their own blog (blog A) to retrieve a key pair for blogs A and B from the keyroll on blog A. Blog A will return the key pair needed for the secure transaction between the blogs (keyAB, keyBA). User A then connects to blog B, identifies itself as blog A (using the ID(A)), passes the required key (key(BA)) and requests an encrypted response. Blog B verifies the keyBA against the encrypted key for ID(A) and keyroll. If the key matches, blog B combines the keyBA for the other key in the keyroll (keyAB) and uses the pair to encrypt the contents of the transaction.

Subsequent to the exchange of IDs, when one of the entities attempts to read the private section of the other entity, the reader sends their ID and the target blog's ID as verification. The target blog's server then checks the IDs for accuracy and permits the access if appropriate.

This allows lightweight server to server authentication. Using SOAP end points, each entity maintains a SOAP end point that is discoverable via <meta> tags on the HTML of the blog page. For example, User A's blog when adding User B's blog can retrieve the HTML for User B's blog, find the <meta> tag with the end point and then issue the request with User A's ID to User B's blog endpoint. While secure HTTP protocols such as SSL can be used, the invention does not require SSL.

In a further embodiment, the identification of linked entries in a blog roll or website may be segregated, thereby allowing different types of trust to be established between different parties. For example, a user may identify certain parts of a blog for consumption by all, others for consumption by family members, and still others for consumption by colleagues at work. By reciprocally linking to web resources using, for example, a different type of listing or a different entry in a blog roll, group segregation can be implemented with the reciprocal trust relationship.

Figure 10:
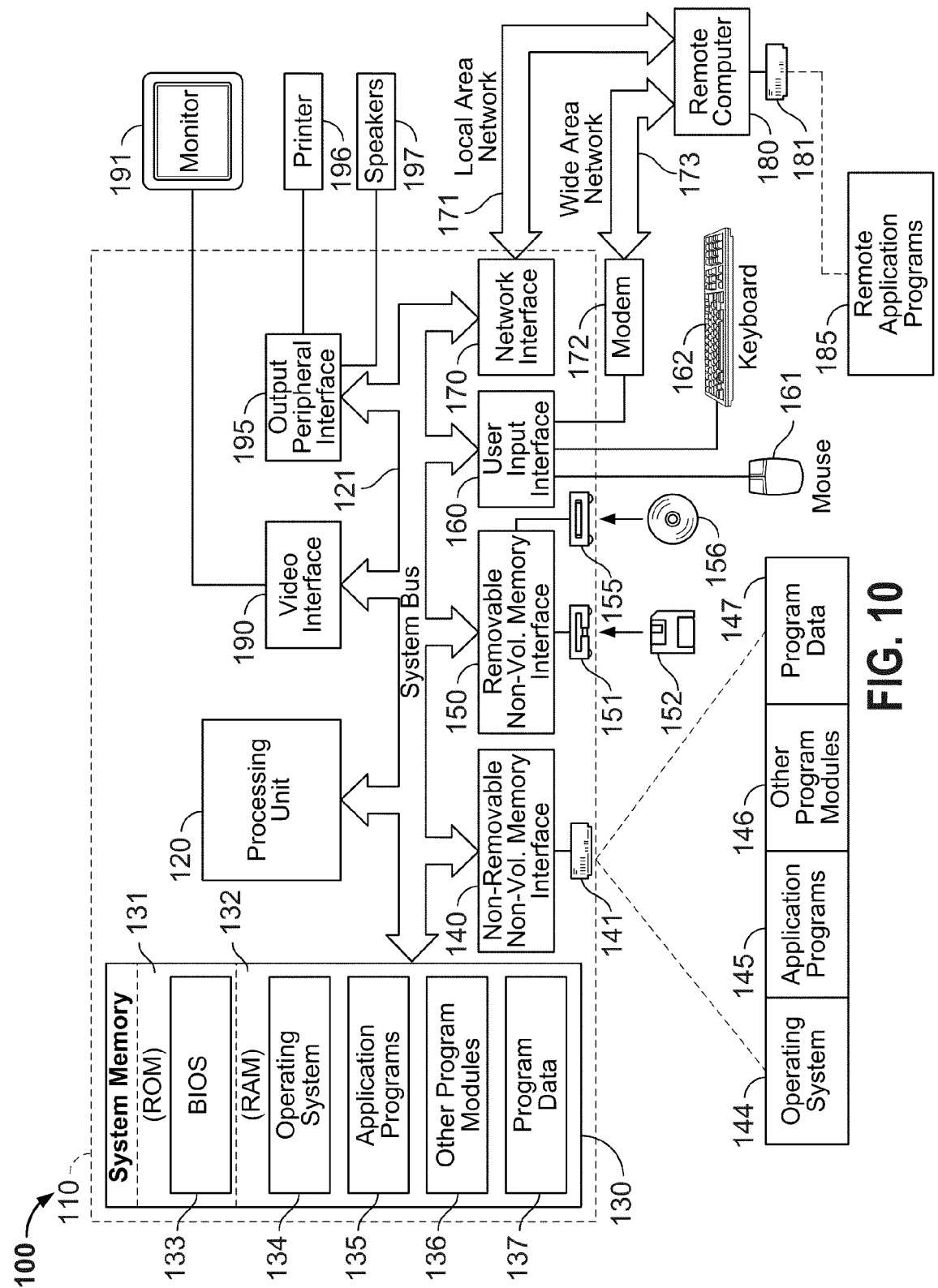
FIG. 10 is a block diagram illustrating a processing device suitable for implementing any of the processing devices discussed herein.

FIG. 10 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137.

The computer 110 may also include other removable/non-removable, volatile/nonvolatile computer storage media. By way of example only, FIG. 10 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 10, provide storage of computer readable instructions, data structures, program modules and other data for the computer 110. In FIG. 10, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 10. The logical connections depicted in FIG. 10 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. One or more processor readable storage devices having encoded thereon instructions for causing one or more processors to perform a method of establishing a trust relationship between entities each controlling a respective web resource, the method comprising:
   receiving a first unique identifier associated with a first entity controlling a first web resource from a first web service upon the first entity establishing a link to a second web resource in the first web resource, the second web resource having public content and private content, the private content viewable only by users who have been authorized by an owner of the second web resource;
   determining when a reciprocal link is made in the second web resource directed to the first web resource, wherein the reciprocal link is made by a second entity controlling the second web resource; creating a trust relationship between the first and second entities based on the reciprocal link by transmitting the first unique identifier associated with the first entity to the second web resource; receiving a second unique identifier associated with the second entity from the second web resource; transmitting the second unique identifier associated with the second entity to the first web resource; and
   verifying that the trust relationship has been established between the first entity and the second entity based on the identifiers; and providing permission to the first entity controlling the first web resource to view the private content on the second web resource upon verifying that the trust relationship has been established between the first and second entities.

2. The one or more processor readable storage devices of claim 1 wherein the first web resource or the second web resource is a website.

3. The one or more processor readable storage devices of claim 1 wherein the first web resource or the second web resource is a web log.

4. The one or more processor readable storage devices of claim 3 wherein the method further comprises identifying an entry in a blog roll.

5. The one or more processor readable storage devices of claim 1 wherein the method further comprises providing the first unique identifier from the first web resource to the second web resource.

6. The one or more processor readable storage devices of claim 5 wherein the first unique identifier comprises a unique URL for the first web resource.

7. The one or more processor readable storage devices of claim 5 wherein the method further comprises providing a first unique key and a second unique key between the first and the second resources with the first unique identifier and the second unique identifier.

8. The one or more processor readable storage devices of claim 5 wherein the step of determining includes receiving a second unique identifier from the second web resource.

9. The one or more processor readable storage devices of claim 7 wherein the method further comprises receiving the second unique key from the second web resource.

10. The one or more processor readable storage devices of claim 1 wherein the method further comprises providing the first unique identifier and a first key received from the first web resource to the second web resource;
    the step of creating includes receiving the second unique identifier and a second key from the second web resource, and
    the method further comprises encrypting web communications for transmission between the first web resource and the second web resource.

11. The one or more processor readable storage devices of claim 1 further comprising updating the trust relationship based on new identifiers for the first and second web resources.

12. The one or more processor readable storage devices of claim 1 further comprising the step of revoking the trust relationship by removing the reciprocal link.

13. The one or more processor readable storage devices of claim 1 wherein the entity is a user.

14. The one or more processor readable storage devices of claim 1 wherein the entity is a group.

15. The one or more processor readable storage devices of claim 1, wherein the step of providing permission to the first entity comprises the steps of:
    receiving from the first entity controlling the first web resource the second unique identifier associated with the second entity that was delivered to the first entity in establishing the trust relationship and the first unique identifier associated with the first entity;
    verifying that the second unique identifier associated with the second entity received from the first entity matches the second unique identifier associated with the second entity; and
    verifying that the second entity controlling the second web resource delivered the second unique identifier associated with the second entity to the first entity.

16. One or more processor readable storage devices having encoded thereon instructions for causing one or more processors to perform a method of establishing a trust relationship between two entities, the method comprising:
    (a) identifying a publication of a first user's blog in a second user's blogroll, wherein the second user's blogroll is a list of third-party blogs that the second user reads;
    (b) transmitting a second unique identifier associated with the second user's blog to the first user's blog;
    (c) receiving a notification of a publication of the second user's blog in the first user's blogroll, the notification includes a first unique identifier associated with the first user's blog, wherein the first user's blogroll is a list of third-party blogs that the first user reads;
    (d) receiving a request from the first user to read private content in the second user's blog that requires permission to view, wherein the request includes the first unique identifier associated with the first user's blog and the second unique identifier associated with the second user's blog;

(e) establishing a trust relationship between the first user's blog and the second user's blog based on the first and second unique identifiers by recording the second unique identifier associated with the second user's blog for the first user's blog and recording the first unique identifier associated with the first user's blog for the second user's blog; and verifying that the trust relationship has been established between the first user's blog and the second user's blog based on the identifiers; and (f) providing permission to the first user to view private content on the second user's blog upon verifying that the first unique identifier associated with the first user's blog received in step (d) matches the first unique identifier associated with the first user's blog received in step (c) and the second unique identifier associated with the second user's blog received in step (d) matches the second unique identifier associated with the second user's blogroll transmitted in step (b).

17. The one or more processor readable storage devices of claim 16 wherein the step (b) includes transmitting a Uniform Resource Locator associated with the second user's blog to the first user's biog.

18. The one or more processor readable storage devices of claim 17 wherein the step (d) includes receiving a Uniform Resource Locator associated with the first user's biog.

19. A system of establishing a trust relationship between entities each controlling a respective web resource, comprising:

a memory for storing software; and a processor accessible to the memory and communicatively coupled to the Internet, the processor executing under the control of software receiving and storing in the memory a first unique identifier associated with a first entity controlling a first web resource from a first web service upon the first entity establishing a link to a second web resource in the first web resource, the second web resource having public content and private content, the private content viewable only by users who have been authorized by an owner of the second web resource, the processor executing under the control of software determining when a reciprocal link is made in the second web resource directed to the first web resource, wherein the reciprocal link is made by a second entity controlling the second web resource, and the processor executing under the control of software creating a trust relationship between the first and second entities based on the reciprocal link by transmitting the first unique identifier associated with the first entity to the second web resource, receiving a second unique identifier associated with the second entity from the second web resource, transmitting the second unique identifier associated with the second entity to the first web resource, and verifying that the trust relationship has been established between the first entity and the second entity based on the identifiers, and the processor executing under the control of software providing permission to the first entity controlling the first web resource to view the private content on the second web resource upon verifying that the trust relationship has been established between the first and second entities.

20. The system of claim 19 further comprising providing a first unique key and a second unique key between the first and the second resources with the first unique identifier and the second unique identifier.

* * * * *

UNITED STATES PATENT AND TRADEMARK OFFICE
CERTIFICATE OF CORRECTION

| | | |
|---|---|---|
| PATENT NO. | : 8,065,421 B2 | Page 1 of 1 |
| APPLICATION NO. | : 13/027701 | |
| DATED | : November 22, 2011 | |
| INVENTOR(S) | : Bansod et al. | |

It is certified that error appears in the above-identified patent and that said Letters Patent is hereby corrected as shown below:

In column 13, line 22, in Claim 17, delete "biog." and insert -- blog --, therefor.

In column 13, line 25, in Claim 18, delete "biog." and insert -- blog. --, therefor.

Signed and Sealed this
Third Day of January, 2012

David J. Kappos
*Director of the United States Patent and Trademark Office*